United States Patent [19]
O'Connor et al.

[11] Patent Number: 5,966,286
[45] Date of Patent: Oct. 12, 1999

[54] COOLING SYSTEM FOR THIN PROFILE ELECTRONIC AND COMPUTER DEVICES

[75] Inventors: Michael O'Connor, Cupertino; Kevin Haley; Rakesh Bhatia, both of San Jose; Daniel Thomas Adams, Menlo Park; Michael Andrew Kast, Palo Alto, all of Calif.

[73] Assignee: Intel Corporation, Santa Clara, Calif.

[21] Appl. No.: 08/658,856

[22] Filed: May 31, 1996

[51] Int. Cl.⁶ ....................................... H05K 7/20
[52] U.S. Cl. ................. 361/699; 165/80.3; 165/104.33; 361/687; 438/106
[58] Field of Search ............... 165/80.3, 104.33, 165/80.4, 185, 104.21–104.26, 104.29; 257/712, 713; 174/15.2, 16.3; 62/259.2; 364/708.1; 29/832, 841, 854, 729, 739, 740; 361/687, 694–703, 701, 717–719; 437/209, 221, 222; 438/106, 118, 584, 675

[56] References Cited

U.S. PATENT DOCUMENTS

| | | | |
|---|---|---|---|
| 4,595,338 | 6/1986 | Kolm et al. | 416/81 |
| 4,706,739 | 11/1987 | Noren | 165/104.14 |
| 4,780,062 | 10/1988 | Yamada | 417/322 |
| 5,008,582 | 4/1991 | Tanuma | 310/332 |
| 5,089,935 | 2/1992 | Ito | 361/383 |
| 5,267,122 | 11/1993 | Glover et al. | 361/704 |
| 5,339,214 | 8/1994 | Nelson | 361/695 |
| 5,383,340 | 1/1995 | Larson | 62/259.2 |
| 5,430,609 | 7/1995 | Kikinis | 361/687 |
| 5,494,098 | 2/1996 | Morosas | 165/121 |
| 5,513,070 | 4/1996 | Xie et al. | 361/700 |
| 5,598,320 | 1/1997 | Toedtman | 361/687 |
| 5,615,084 | 3/1997 | Anderson | 165/80.3 |
| 5,646,824 | 7/1997 | Ohashi et al. | 361/704 |

FOREIGN PATENT DOCUMENTS

| | | | |
|---|---|---|---|
| 572326A2 | 5/1993 | European Pat. Off. | 165/80.3 |
| 451994 | 10/1993 | Japan . | |
| 5-259673 | 10/1993 | Japan . | |

*Primary Examiner*—Gerald Tolin
*Attorney, Agent, or Firm*—Blakely, Sokoloff, Taylor & Zafman LLP

[57] ABSTRACT

An apparatus and method for removing heat from a heat generating component located within a thin-profile consumer electronic or computer system enclosure is disclosed. In one embodiment the cooling system of the present invention includes an air duct comprising a thermally conductive housing having internal fins dispersed along the internal walls of the duct. An air flow generator produces an air flow that is directed from an inlet port located at or near the center of the air duct to first and second exit ports located at opposite ends of the duct. A low resistance thermal path, such as a heat pipe, transfers heat from the heat generating component to the air duct housing.

19 Claims, 9 Drawing Sheets

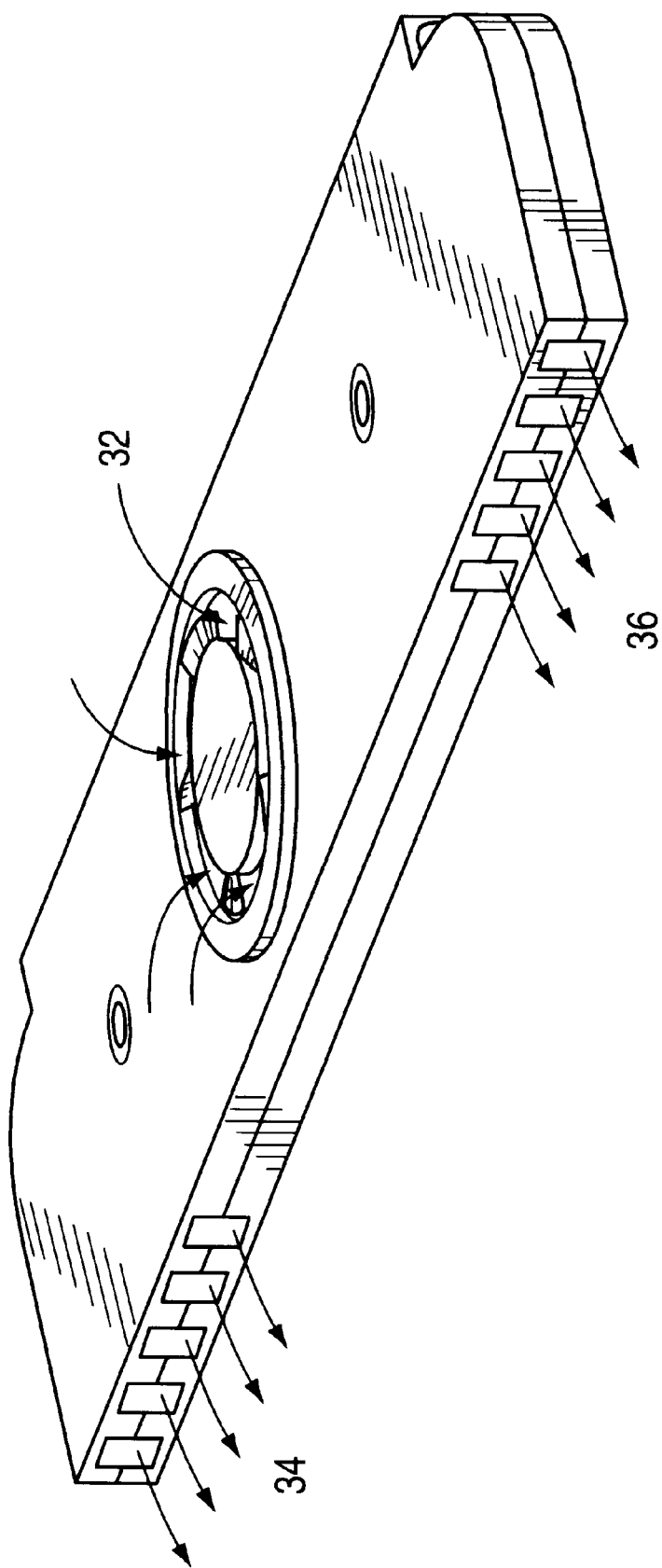

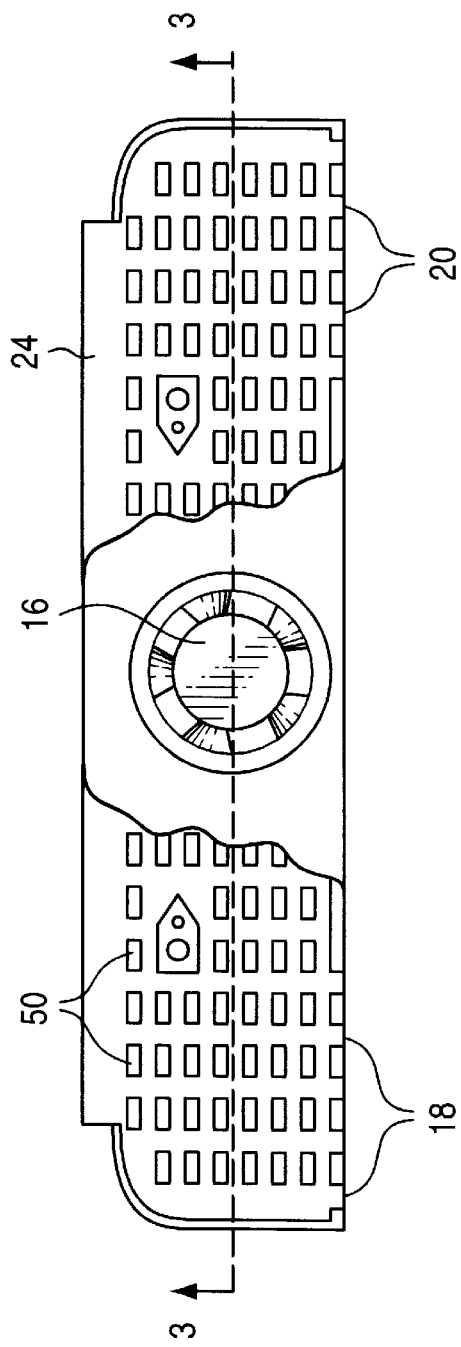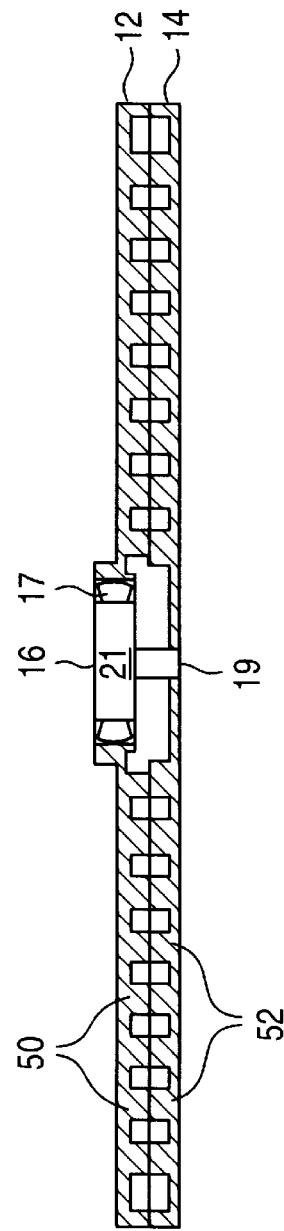

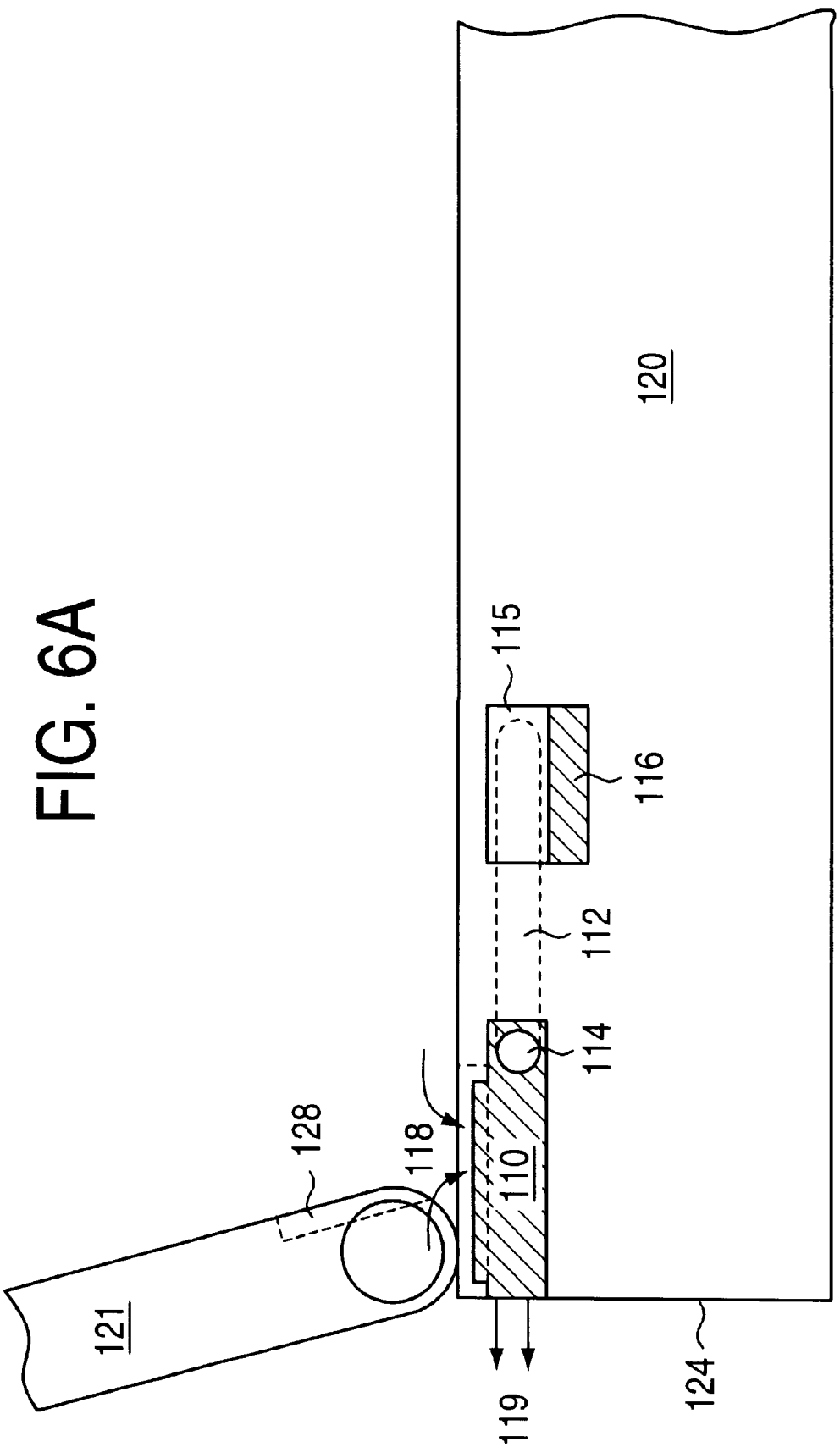

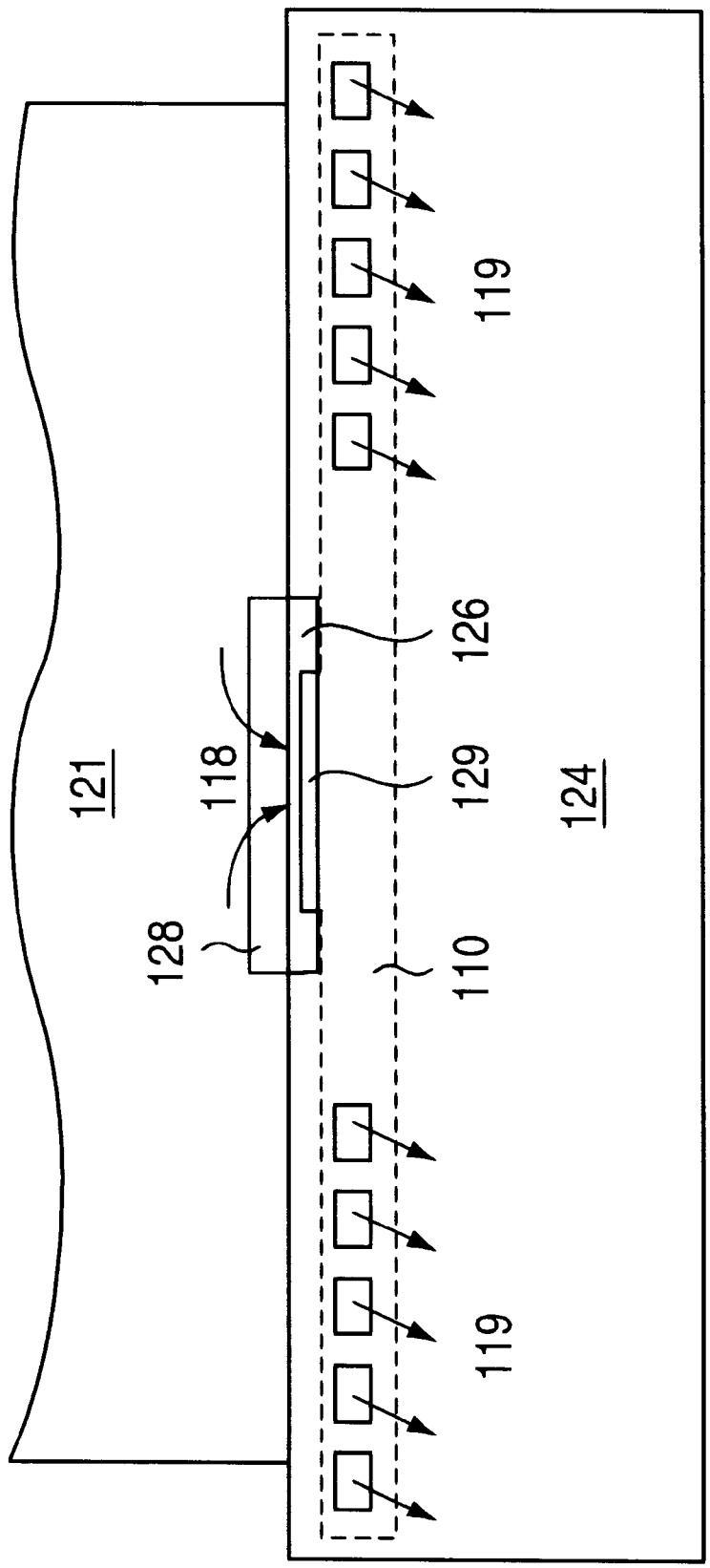

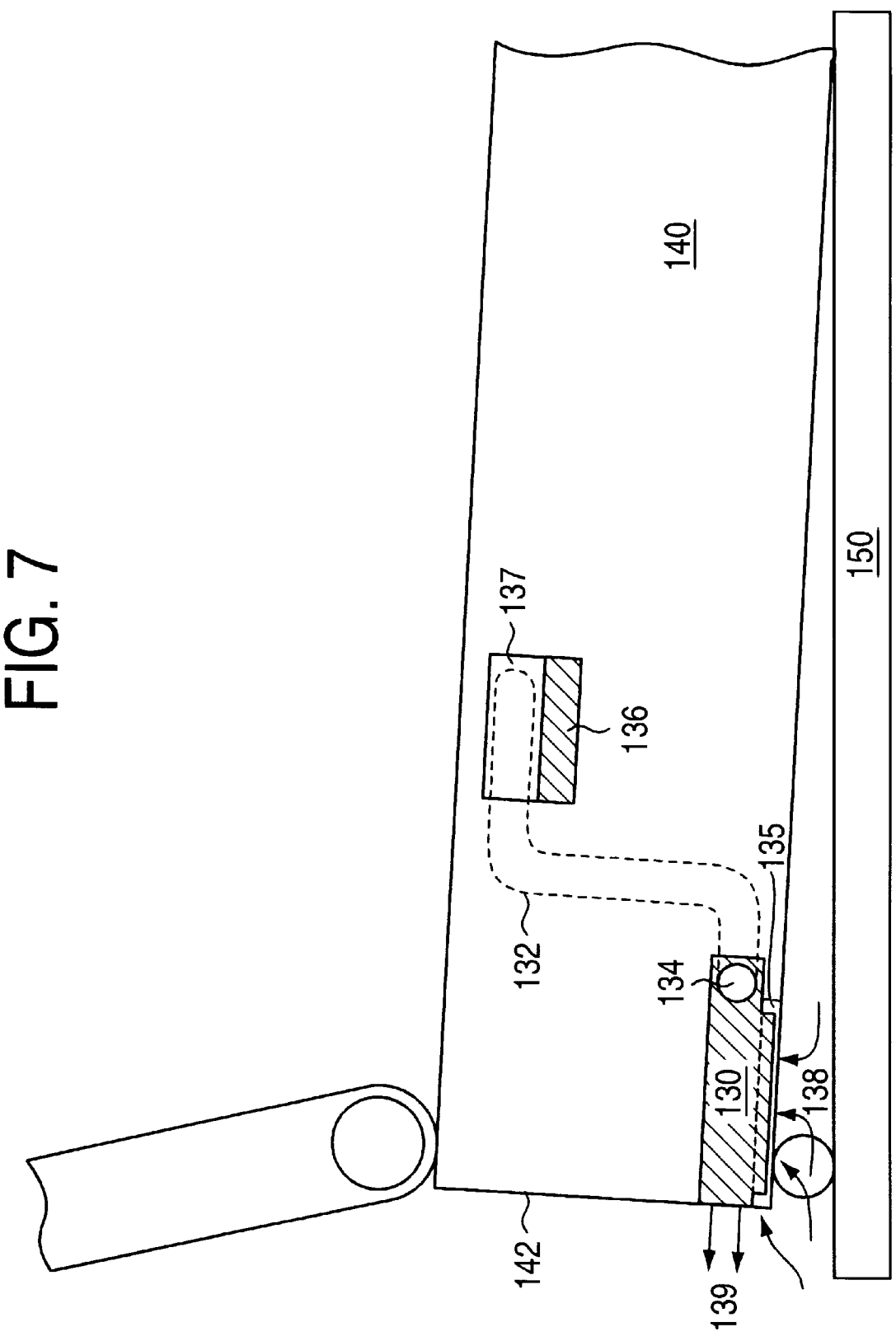

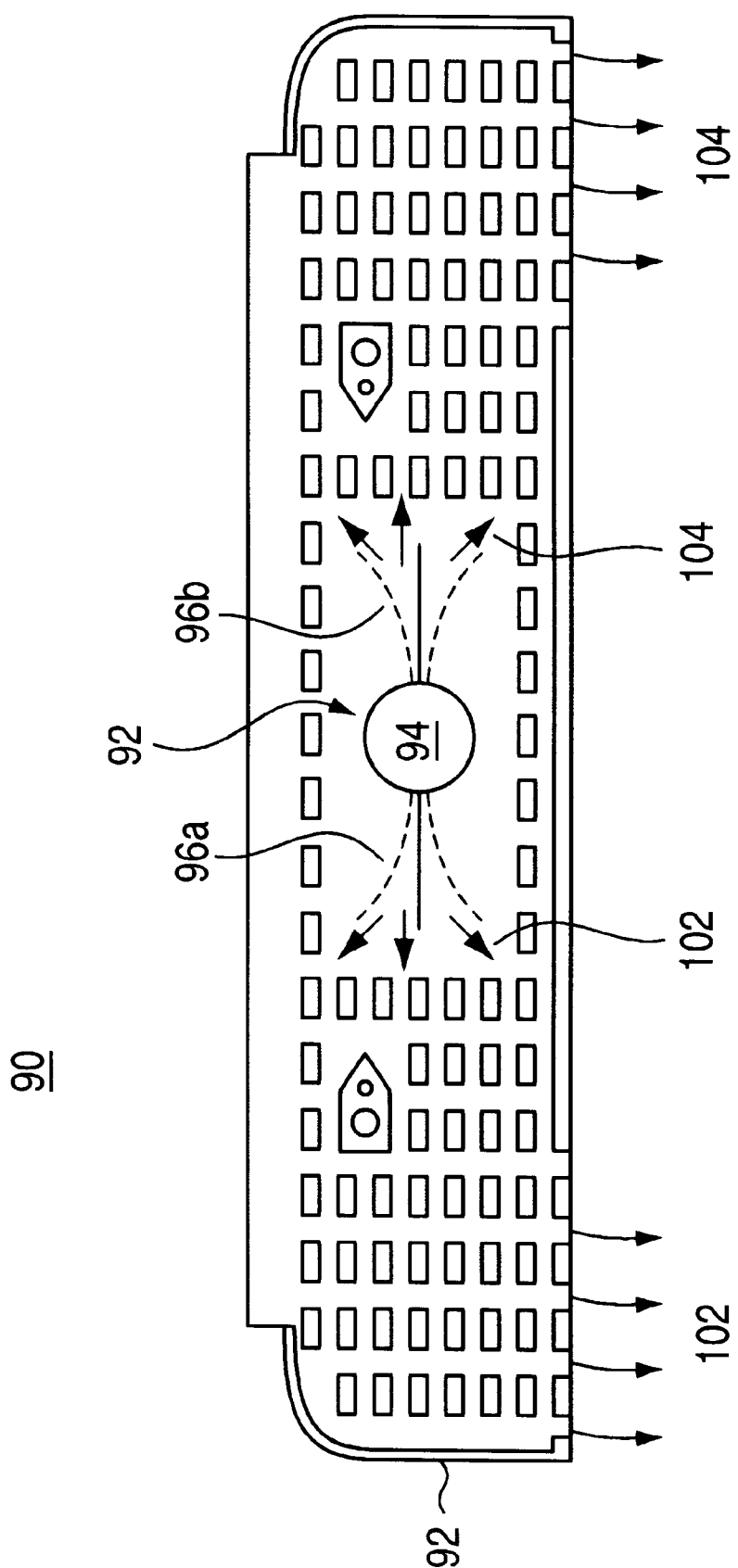

COOLING SYSTEM FOR THIN PROFILE ELECTRONIC AND COMPUTER DEVICES

FIELD OF THE INVENTION

The present invention relates to an apparatus and method for cooling high heat dissipating components within electronic and computer system enclosures. More particularly, the invention relates to a cooling system for removing heat from high heat dissipating components located within small form factor consumer electronic and computer systems.

BACKGROUND OF THE INVENTION

Integrated circuits (ICs) are typically housed within a plastic or ceramic package. The packages have leads or surface pads that are soldered to a printed circuit board. The circuit board and package are often located within an enclosed computer chassis that contains other circuitry associated with the computer system such as peripherals, memory cards, video cards, power supplies, etc..

It is desirable to have a high rate of heat transfer from the IC package in order to maintain the junction temperatures of the IC within safe operating limits. Modern microprocessors typically employ millions of transistors in internal circuitry that require some type of cooling mechanism, otherwise, excessive junction temperatures may affect the performance of the circuit and cause permanent degradation of the device. Hence, as the performance of integrated circuits continue to expand, the need to provide more efficient, reliable and cost effective heat removal methods has become increasingly important in the design of computer system enclosures and particularly in small general purpose computer systems, such as laptop and notebook computers. There also exists a need to remove heat from high-power profile components located within other small form factor or thin profile electronic devices.

High heat dissipating components located within the small confines of some consumer electronic devices may create "hot spots" at certain locations along the external casing of the device. These hot spots may be uncomfortable to the touch and, in some cases, may cause injury. Therefore, it is desirable to dissipate heat away from high heat generating components located within the enclosure of small form factor devices in such a way as to keep the internal components within their specified operating temperature range and to preclude the creation of hot spots along the exterior of the enclosure.

A number of prior art methods have been used to remove heat from heat generating components located within the confines of a computer system enclosure. For example, the method of cooling integrated circuit devices within notebook computers has evolved from the simple attachment of a finned heat sink to the top surface of the device, to the development of finned heat sinks having integral fans. More recent developments have include the use of large, flat heat spreading plates. In such applications, the integrated circuit (generally, the CPU) is directly or indirectly attached to a metal plate having a large thermal mass and a large heat transfer surface area. In some instances, the integrated circuit is thermally coupled to the heat spreading plate by a heat pipe or other low resistance thermal path. More recently, forced cooling air has been used to cool one side of a heat spreading plate having an integrated circuit attached to the other side. Although these heat transfer methods have proved sufficient in the past, they do not provide the heat removal capacity and/or efficiency needed to cool current and future high-performance microprocessors in portable general-purpose computers and other thin profile electronic devices.

What is needed then is an apparatus and method which solves the aforementioned problems associated with cooling internal electronic circuits located within portable consumer electronic and computer devices. Particularly, what is needed is a highly efficient cooling system that is conformable to the size and power consumption restrictions imposed by small form factor and thin profile electronic devices, such as, for example, notebook computers.

SUMMARY OF THE INVENTION

An apparatus and method for removing heat from a heat generating component located within a thin-profile consumer electronic or computer system enclosure is disclosed. In one embodiment the cooling system of the present invention includes an air duct comprising a thermally conductive housing having internal fins dispersed along the internal walls of the duct. An air flow generator produces an air flow that is directed from an inlet port located at or near the center of the air duct to first and second exit ports located adjacent opposite ends of the duct. A low resistance thermal path, such as a heat pipe, transfers heat from the heat generating component to the air duct housing.

BRIEF DESCRIPTION OF THE DRAWINGS

The present invention is illustrated by way of example and is not limited by the figures of the accompanying drawings, in which like references indicate similar elements, and in which:

FIG. 1B illustrates the air flow into and out of the heat exchanger depicted in FIG. 1A.

FIG. 2 illustrates a partial cut-away top view of the heat exchanger depicted in FIG. 1A.

FIG. 3 illustrates a side view of the heat exchanger shown in FIG. 2 along lines 3—3.

FIG. 6A illustrates a side view of a portable computer according to one embodiment of the present invention.

FIG. 6B illustrates a view of the back side of the portable computer shown in FIG. 6A.

FIG. 7 illustrates a side view of a portable computer according to another embodiment of the present invention.

FIG. 8 illustrates a top view of a heat exchanger in accordance with another embodiment of the present invention.

DETAILED DESCRIPTION

An apparatus and method for removing heat from a heat generating component located within a thin-profile consumer electronic or computer system enclosure is described. In the following description, numerous specific details are set forth such as material types, dimensions, processing steps, etc., in order to provide a thorough understanding of the present invention. However, it will be obvious to one of skill in the art that the invention may be practiced without these specific details. In other instances, well known elements and processing techniques have not been shown in particular detail in order to avoid unnecessarily obscuring the present invention. In order to illustrate the need for cooling systems that are capable of being integrated within an enclosure having limited available space, this discussion will mainly be limited to those needs associated with removing heat from integrated circuits housed within portable computers, such as notebook and laptop computers. It will be recognized, however, that such focus is for descriptive purposes only and that the apparatus and methods of the present invention are applicable to other thin profile or small form factor electronic devices.

Figure 1A:
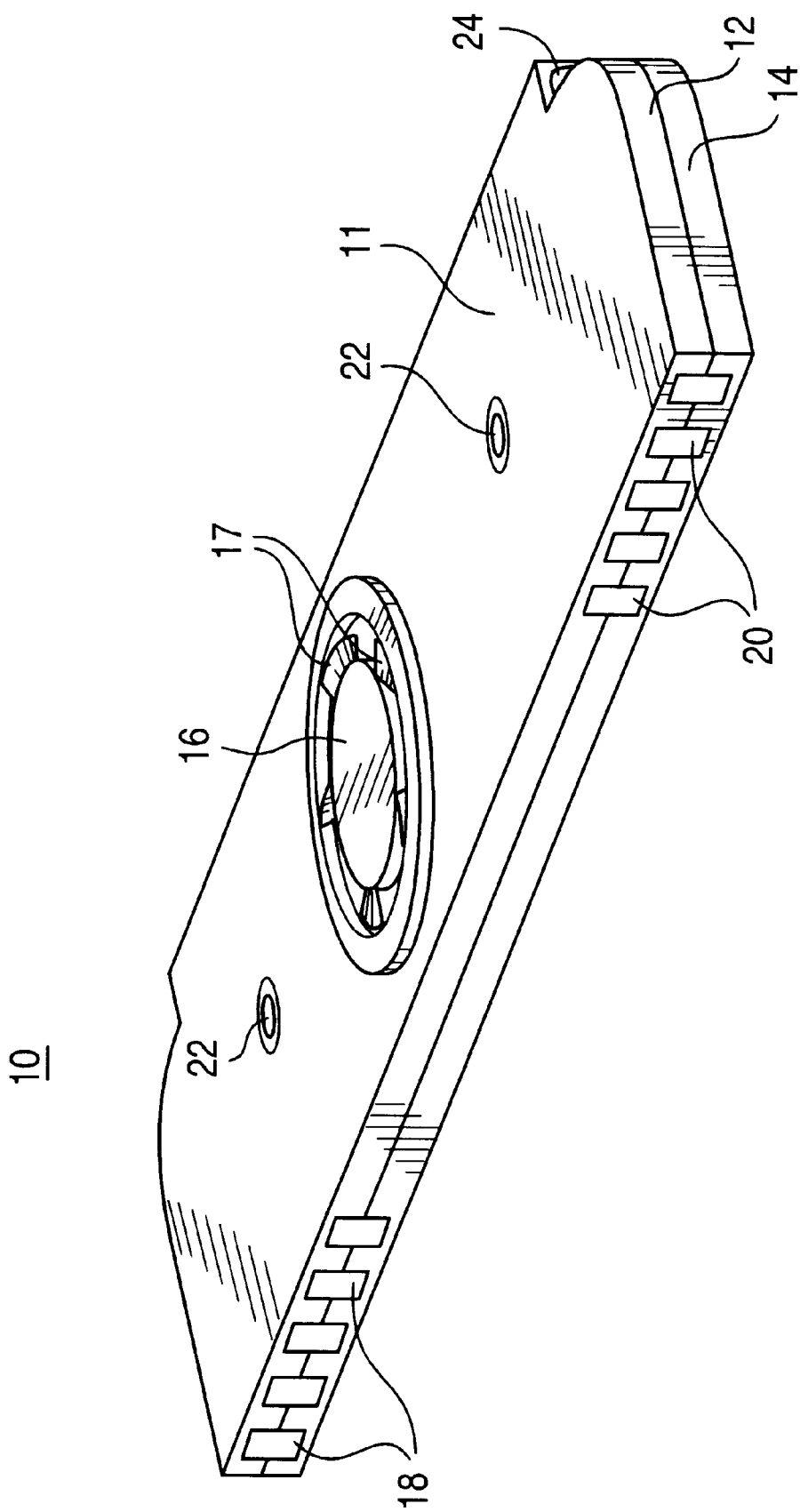
FIG. 1A illustrates a perspective view of a heat exchanger according to one embodiment of the present invention.

FIG. 1A illustrates a perspective view of a heat exchanger assembly 10 in one embodiment of the present invention. Heat exchanger 10 includes an air duct 11 consisting of an upper plate 12 and a lower plate 14. Plates 12 and 14 are constructed of a thermally conductive material, such as aluminum. An air generating device 16 is positioned within an opening 13 located at or near the center of upper plate 12. Threaded fasteners 22 are generally used to attach the two plates. In the embodiment of FIG. 1A, an integral clamp structure 24 is provided for attaching a heat pipe or other similar device to the heat exchanger housing. In this manner heat may be transferred from a remotely located heat generating component to heat exchanger 10. It is appreciated, however, that other devices that are capable of providing a low resistance thermal path from the heat generating component to the heat exchanger housing may also be used.

As shown in FIG. 1B, an air flow 32 is produced by air generating device 16 and directed into air duct 11 through opening 13. Inside the air duct, air flow 32 is split into two separate air flow streams 34 and 36. Air flow streams 34 and 36 are directed toward exit ports 18 and 20 located adjacent opposite ends of the air duct. FIG. 2 shows a partial cut-away view of the heat exchanger illustrated in FIG. 1A. FIG. 3 shows a cross-sectional view of the heat exchanger along lines 3—3. As depicted in FIGS. 2 and 3, fins 50 and 52 are positioned along the internal walls of plates 12 and 14, respectively. Fins 50 and 52 are typically arranged in a corresponding relationship so as to form small air channels within air duct 11. The fins, in combination with the thin profile of the air duct, act to enhance the air velocity though the air duct and to promote the mixing of air flow streams 34 and 36 with boundary film layers formed along the inner walls of plates 12 and 14. Such mixing tends to break up or thin the boundary film layers formed along plates 12 and 14 and, as a result, greatly increases the rate of heat transfer between plates 12 and 14 and air flow streams 34 and 36. Fins 50 and 52 also increase the effective heat transfer surface area between air flow streams 34 and 36 and plates 12 and 14.

As noted earlier, modern microprocessors employ millions of transistors in internal circuitry and operate at ever increasing speeds. As a result, the amount of heat generated by modern microprocessor components has increased significantly. Particular problems arise when these components, and other high heat generating components, are placed within constrained compartments, such as portable computer enclosures. The cooling system of the present invention provides a highly efficient, low power consuming, heat exchanger apparatus that is adaptable to the small confines of a portable computer enclosure. In one embodiment, the heat exchanger 10 comprises an air duct 11 and fan 16 assembly that is connectable to a passive heat transfer device, such as a heat pipe, by clamp 24. Fan 16 comprises a miniature, low power consuming axial flow fan having blades 17 that draw cool air into air duct opening 13. As shown in FIG. 3, fan 16 includes a hub 21 that houses a motor, a rotor 19 and blades 17. A control circuit is generally included within the fan assembly The overall diameter of fan 16 is approximately 25 mm. The air flow generated by fan 16 is directed down toward lower plate 14. The air flow impinges lower plate 14 and is split into two separate flow streams that are directed in opposite directions along the length of the air duct. In one embodiment, air duct 11 has a thickness, length and width of 7 mm, 30 mm, and 144 mm, respectively. The fins 50 and 52 formed along the inner walls of plates 12 and 14 are generally spaced equidistantly and have a rectangular cross-section of 1.3 mm by 2.0 mm. The air flow channels formed by fins 50 and 52 typically have a width of approximately 2 mm. As discussed above, the unique configuration of heat exchanger 10 provides a high efficient cooling apparatus that may be used in a variety of portable electronic devices.

Figure 4:
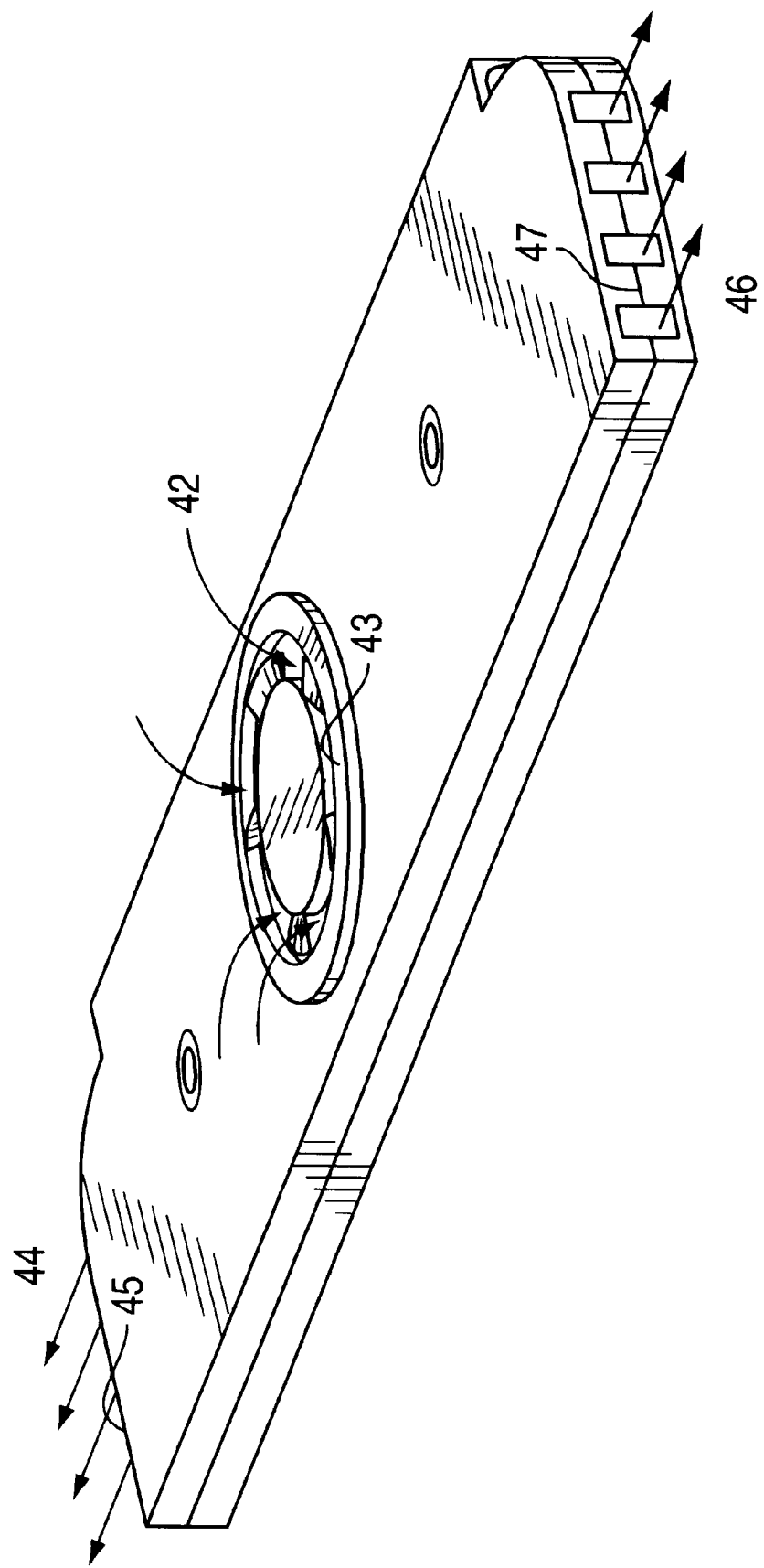
FIG. 4 illustrates a perspective view of a heat exchanger according to another embodiment of the present invention.

FIG. 4 illustrates another embodiment of the present invention wherein an air flow 42 is directed into the air duct through an opening 43 in the upper plate of the assembly. Air flow 42 is split into two separate air flow streams 44 and 46 and directed through the air duct in the same manner described above in conduction with the embodiment of FIG. 1A, except that air flow streams 44 and 46 are exhausted at points along the side ends 45 and 47 of the air duct.

Figure 5:
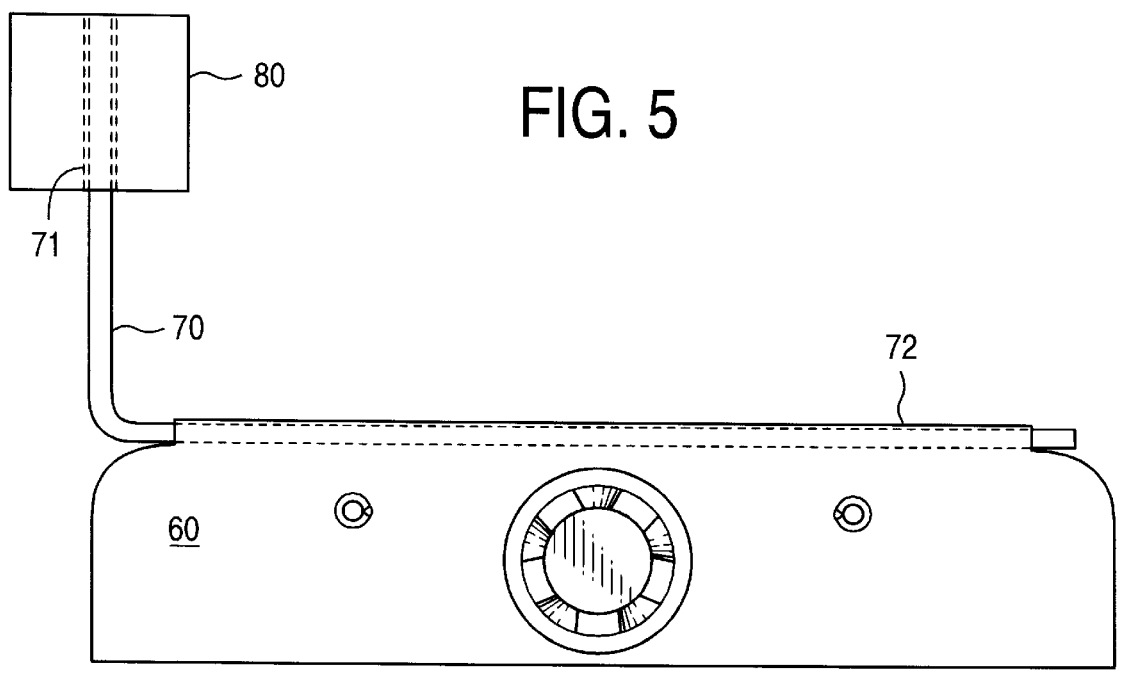
FIG. 5 illustrates a cooling system according to one embodiment of the present invention.

With reference to FIG. 5, an apparatus for transferring heat from an integrated circuit package 80 to a heat exchanger 60 according to the present invention is shown. In accordance with one embodiment of the invention, a heat pipe 70 comprising an evaporator portion 71 and a condenser portion 72 is used to transfer heat from integrated circuit 80 to the heat exchanger housing. The evaporator portion 71 of heat pipe 70 is typically embedded within a copper or aluminum mating plate (not shown) that is preferably attached directly to the integrated circuit 80. In some applications, the mating plate is attached to the back side of a printed circuit board containing the integrated circuit. In those situations, the integrated circuit is thermally coupled to the mating plate through solid metal vias or through a copper slug embedded within the printed circuit board. The heat pipe 70 typically contains a fluid that flows along a wick (not shown) attached to the inner surface of the pipe. Heat is applied to the evaporator portion 71 of the pipe that is adjacent to package 80 and removed from the condenser portion 72 of the pipe that is coupled to heat exchanger 60. The heat vaporizes the fluid which creates a pressure differential between the evaporator portion 71 and condenser portion 72 of heat pipe 70. The pressure differential pumps the fluid through the wick from the condenser portion to the evaporator portion. The vaporized fluid is then pumped from the evaporator portion 71 back to the condenser portion 72. Pursuant to the present invention, heat is transferred from the condenser portion 72 of heat pipe 70 to the thermally conductive housing of heat exchanger 60. The heat is then transferred away from the heat exchanger by directing a cool air flow into and through the heat exchanger air duct in the manner described above, and exhausting the air flow into the surrounding environment. Heat pipe 70 may be attached to heat exchanger 60 with the use of an integral clamp structure. In such an instance, a thermal grease is applied at the clamp and heat pipe interface to enhance the heat transfer rate between the two components. Other attachment methods may also be used. For example, the condenser portion 72 of heat pipe 70 may be bonded to heat exchanger 60 with a high thermal conductive adhesive.

Turning now to FIG. 6A, a cooling system of the present invention is shown housed within a portable computer system enclosure 120. As illustrated, heat exchanger 110 is positioned such that cool air 118 is directed into the heat exchanger air duct along the top surface of the computer casing. Heated air 119 is exhausted from heat exchanger 110 along the back side 124 of enclosure 120. In an alternative embodiment, heated air 119 may be exhausted along the side surfaces of the enclosure. In any event, the air duct exhaust ports should be positioned along an external wall of the computer casing so that the heated air is directed out of enclosure 120. The heated air 119 should also be directed away from the user. A heat pipe 112 provides a low resistance thermal path from an integrated circuit package 116 to heat exchanger 110 via a conductive plate 115. Alternatively, heat pipe 112 may be bonded directly to package 116 with the use of a thermal adhesive. FIG. 6B shows the back side 124 of computer enclosure 120. Recesses 126 and 128 are formed within the computer casing and within the lower edge of the display panel 121, respectively. The recesses ensure that an adequate air flow path is available to the heat exchanger air duct inlet 129 when the computer display lid 121 is in a closed position.

FIG. 7 illustrates yet another manner of integrating the cooling system of the present invention into a portable computer system enclosure 140. In the embodiment of FIG. 7, heat exchanger 130 is positioned such that cool air 138 is directed into the heat exchanger air duct along a bottom and back surface of the computer casing. An air channel 135 is provided along the bottom surface of the computer to provide an air flow path into the heat exchanger when the computer is resting on a table 150 or other solid surface. The computer may also include a fluted bottom to direct air flow to the heat exchanger air duct intake. A heat pipe 132 thermally couples heat exchanger 130 to an integrated circuit package 136 via a thermally conductive mating plate 137. Heated air 139 is directed away from the computer system enclosure via air duct exhaust ports that are preferably positioned flush along the back side 142 of the computer system enclosure 140. It is important to note that FIGS. 6A, 6B and 7 are illustrative of only two of many possible cooling system arrangements. For example, the heat exchanger air duct intake may be positioned along a side of the computer system enclosure, or at other points along the top or bottom surfaces of the enclosure. It is important, however, to place the air intake and exhaust ports in positions to preclude blocking of the air flows into and out of the heat exchanger. It is also preferable to place the air intake port at a location that will provide the coolest possible air flow into the heat exchanger. In this manner, a maximum achievable heat transfer is established across the heat exchanger.

The compact design, thin construction and high efficient cooling method of the present invention provides designers of small form factor and thin profile electronic devices a high degree of versatility as to the placement of the cooling system components within the electronic device enclosure. As mentioned above, the air duct intake may be positioned along the top, bottom or side exterior surfaces of an enclosure casing. In addition, a heat generating component from which heat is to be removed can be located virtually anywhere within the electronic device enclosure via a heat pipe or other low thermal resistance heat path.

In the foregoing description a cooling system has been described wherein an axial flow fan directs air through the heat exchanger assembly. It should be understood, however, that the air generating device of the present invention may include any of a number of devices and configurations. For example, in one implementation, the present invention may include the use of a fully embedded radial or axial flow fan. FIG. 8 illustrates another manner of implementing the present invention. In the embodiment of FIG. 8, a resonant cantilever vibrator 92 is used to generate an air flow through the air duct of heat exchanger 90. The resonant cantilever vibrator 92 comprises a piezoelectric actuator 94 having cantilever members 96*a* and 96*b* attached to and positioned along opposite sides of the actuator. When a voltage is applied to actuator 94, cantilever members 96*a* and 96*b* oscillate to produce air flow streams 102 and 104. Air flow streams 102 and 104 pass through the heat exchanger air duct and are exhausted adjacent opposite ends of the heat exchanger.

Thus, an improved cooling system for small form factor and thin profile electronic devices has been described. Although the present invention has been described particularly with reference to FIGS. 1A through 8, it is contemplated that many changes and modifications may be made by one of ordinary skill in the art without departing from the spirit and scope of the present invention. For example, the size and shape of the heat exchanger, air duct, fins, intake and exhaust ports may be altered. Materials other than those described that possess the proper heat transfer and weight characteristics may also be used.

What is claimed is:

1. An apparatus removing heat from a heat generating component, said apparatus comprising:

a heat pipe comprising an evaporator portion and a condenser portion, said heat generating component being thermally coupled to said evaporator portion;

an air duct comprising a housing having internal fins, said air duct directing an air flow from an inlet port located near the center of said air duct to first and second exit ports located at opposite end portions of said air duct, said condenser portion of said heat pipe being attached to said housing; and an air flow generator coupled to said inlet port for producing said air flow.

2. The apparatus of claim 1 wherein said heat generating component comprises an integrated circuit.

3. The apparatus of claim 1 wherein said housing comprises a first plate and a second plate having respective first and second internal surfaces, said first internal surface having a first array of protruding members that constitute said internal fins.

4. The apparatus of claim 1 wherein said housing comprises a first plate and a second plate having respective first and second internal surfaces, said first internal surface having a first array of protruding members, said second internal surface having a second array of protruding members wherein said first and second array of protruding members constitute said internal fins.

5. The apparatus of claim 1 wherein said housing comprises a material having a high thermal conductivity.

6. The apparatus of claim 1 wherein said housing comprises aluminum.

7. The apparatus of claim 1 wherein said air flow generator comprises a fan.

8. The apparatus of claim 1 wherein said air flow generator comprises a resonate cantilever vibrator.

9. An apparatus cooling an integrated circuit package assembly located within a portable computer chassis, said apparatus comprising:

a heat exchanger comprising:
an air duct having a thin cross-section relative to the width of said duct, said air duct comprising a housing having facing first and second major internal surfaces and an array of fins disposed between said first and second surfaces, said housing further comprising an inlet port disposed at or near a center portion of said air duct and first and second exit ports disposed at respective opposite first and second end portions of said duct; and an air flow generator coupled to said inlet port for producing a first and a second air flow, said first air flow being directed from said inlet port to said first exit port, said second air flow being directed from said inlet port to said second exit port;

a heat pipe having an evaporator portion and a condenser portion, said integrated circuit package being thermally coupled to said evaporator portion; said condenser portion being coupled to said housing of said air duct.

10. The apparatus of claim 9 wherein said fins comprise integrally formed protruding members along said first internal surface.

11. The apparatus of claim 9 wherein said fins comprise a first and second array of protuberances integrally formed along said first and second internal surfaces, respectively.

12. The apparatus of claim 9 wherein said housing comprises a material having a high thermal conductivity.

13. The apparatus of claim 9 wherein said housing comprises aluminum.

14. The apparatus of claim 9 wherein said air flow generator comprises a fan.

15. The apparatus of claim 9 wherein said air flow generator comprises a resonate cantilever vibrator.

16. A portable computer comprising:

an enclosure having an air duct comprising a housing having internal fins, said air duct directing an air flow from an inlet port located near the center of said air duct to first and second exit ports located adjacent opposite end portions of said air duct, said air duct having a substantially equal width as said enclosure, said enclosure comprising first, second and third sides;

an air flow generator coupled to said inlet port for producing said air flow; and heat transfer means thermally coupling a heat generating component located within said enclosure to said air duct housing.

17. The portable computer of claim 16 wherein said first and second exit ports face said first side such that said air flow leaves said enclosure from said first side.

18. The portable computer of claim 16 wherein said first and second exit ports face said second and third sides, respectively, such that said air flow leaves said enclosure from said second and third sides.

19. A method for cooling a heat generating component located within an enclosed compartment, said method comprising the steps of:

thermally coupling said heat generating component to the housing of an air duct having a thin cross-section relative to the width of said air duct, including the steps of thermally coupling said component to an evaporator portion of a heat pipe, and thermally coupling a condenser portion of said heat pipe to said air duct housing; and producing an air flow through said air duct by directing air external to said compartment into an inlet port located at or near the center of said air duct and splitting said air flow into a first air flow and a second air flow, said first air flow being directed to a first exit port located at a first end portion of said air duct, said second air flow being directed to a second exit port located at a second end portion of said air duct.

* * * * *